(12) United States Patent
Flinton (10) Patent No.: US 10,894,598 B2
(45) Date of Patent: Jan. 19, 2021

(54) LANDING GEAR CONTROLLER

(71) Applicant: AIRBUS OPERATIONS LIMITED, Bristol (GB)

(72) Inventor: David Flinton, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 16/219,479

(22) Filed: Dec. 13, 2018

(65) Prior Publication Data
US 2019/0185148 A1    Jun. 20, 2019

(30) Foreign Application Priority Data

Dec. 14, 2017 (GB) .................................. 1720906.5

(51) Int. Cl.
*G08B 21/00*  (2006.01)
*B64C 25/28*  (2006.01)

(52) U.S. Cl.
CPC .................................. *B64C 25/28* (2013.01)

(58) Field of Classification Search
CPC ...... B64C 25/28; B64C 25/10; B64D 45/0005
USPC ....................................................... 340/960
See application file for complete search history.

(56) References Cited

U.S. PATENT DOCUMENTS

| | | | |
|---|---|---|---|
| 2003/0033927 A1* | 2/2003 | Bryant | ................ B64C 25/001 91/471 |
| 2012/0097792 A1 | 4/2012 | Ernis et al. | |
| 2018/0170529 A1* | 6/2018 | Schmidt | ................ B64C 13/16 |

FOREIGN PATENT DOCUMENTS

| | | |
|---|---|---|
| CN | 103204239 | 7/2013 |
| CN | 105 083 541 | 11/2015 |
| CN | 103 640 692 | 12/2015 |
| EP | 3 339 167 | 6/2018 |
| EP | 3 357 814 | 8/2018 |
| WO | 2014/201225 | 12/2014 |

OTHER PUBLICATIONS

European Search Report cited in EP 12810651.8, dated May 7, 2019, 7 pages.

\* cited by examiner

*Primary Examiner* — Tanmay K Shah
(74) *Attorney, Agent, or Firm* — Nixon & Vanderhye P.C.

(57) ABSTRACT

A landing gear controller for an aircraft is configured to: detect an extension time for a landing gear, and if the detected extension time meets a predetermined criterion, provide a warning signal to indicate potential failure of a landing gear uplock hook. The landing gear controller may be in a landing gear system.

7 Claims, 9 Drawing Sheets

LANDING GEAR CONTROLLER

RELATED APPLICATION

This application claims priority to United Kingdom patent application GB 1720906.5 filed 14 Dec. 2017, the entire contents of which is incorporated by reference.

TECHNICAL FIELD

The present invention relates to a landing gear controller, to a system comprising the landing gear controller and a landing gear extension and retraction system, to a method to detect failure of a landing gear uplock hook.

BACKGROUND

In many known aircraft, a landing gear of the aircraft is held in an extended position when the aircraft is on the ground, and is retracted to a stowed position once the aircraft has taken off. The landing gear subsequently is extended to the extended position again before the aircraft lands. Movement of the landing gear between the stowed position and the extended position is typically controlled by a pilot using cockpit controls of the aircraft, such as a landing gear lever.

During flight, the landing gear is typically held in the retracted position by an uplock hook, and landing gear actuators used for actuating the landing gear are de-pressurised until the landing gear is to be extended to the extended position again before the aircraft lands. The uplock hook prevents the landing gear from resting on a landing gear bay door when the landing gear actuators are de-pressurised.

SUMMARY

A first aspect of the present invention provides a landing gear controller for an aircraft, the controller configured to: detect an extension time for a landing gear, and, if the detected extension time meets a predetermined criterion, provide a warning signal to indicate potential failure of a landing gear uplock hook.

Optionally, a landing gear extension process comprises moving a landing gear bay door from a closed position to an open position and, when the landing gear bay door has reached the open position, extending a landing gear from a retracted position to an extended position, and the extension time comprises a time between the issue of a release signal to move the landing gear bay door to the open position, and the landing gear controller receiving a confirmation signal that the landing gear is in the extended position.

Optionally, upon receipt of a command signal to extend the landing gear, the landing gear controller is configured to delay extending the landing gear by a predetermined amount of time to increase the expected extension time of the landing gear.

Optionally, the landing gear is a landing gear of two main landing gears on an aircraft, and the landing gear controller is configured to: detect the extension time for the two main landing gears, and determine a difference between the extension time for each of the respective main landing gears, wherein the predetermined criterion is a threshold difference in the extension time for each of the respective main landing gears, and, if the difference between the extension time for each of the respective main landing gears exceeds the threshold, the landing gear controller is configured to provide the warning signal.

Optionally, the main landing gears are configured to extend simultaneously.

Optionally, the difference between the extension time for each of the respective main landing gears is determined by measuring the lag time between the landing gear controller receiving respective confirmation signals that the respective landing gear is in an extended position.

Optionally, the predetermined criterion is a threshold based upon an expected extension time, and the landing gear controller is configured to provide the warning signal if the detected time is below the threshold.

Optionally, the predetermined criterion is set based on the operational conditions of the aircraft at the time of extending the landing gear.

A second aspect of the present invention provides an aircraft landing gear system, comprising: a landing gear extension and retraction system, and a landing gear controller according to the first aspect of the present invention, wherein the landing gear controller is operatively connected to the landing gear extension and retraction system.

A third aspect of the present invention provides a method to detect failure of a landing gear uplock hook, the method comprising: moving a landing gear bay door from a closed position to an open position, extending a landing gear from a retracted position to an extended position, measuring an extension time for the landing gear, determining if the measured time meets a predefined criterion, and if the predefined criterion is met, providing a warning signal to indicate potential failure of a landing gear uplock hook.

Optionally, the method comprises, upon receipt of a command signal to extend the landing gear, delaying the extending by a predetermined amount of time.

Optionally, the extension time is a time between a release signal to move the landing gear bay door to the open position being issued, and a landing gear controller receiving a confirmation signal that the landing gear is in the extended position.

Optionally, the extending comprises extending two main landing gears from a retracted position to an extended position, and the method comprises: measuring the extension time for the two main landing gears on an aircraft, determining a difference between the extension time for each of the respective main landing gears, and if the difference exceeds a threshold, providing the warning signal.

Optionally, the predetermined criterion is a threshold time based upon an expected extension time, the determining comprises comparing the extension time to the threshold time, and the method comprises providing the warning signal if the extension time is below the threshold time.

A fourth aspect of the present invention provides a non-transitory computer-readable storage medium storing instructions that, if executed by a processor of a landing gear controller, cause the processor to carry out a method according to the third aspect of the present invention.

A fifth aspect of the present invention provides a landing gear controller configured to delay extension of a landing gear, to measure a time taken for the landing gear to reach an extended position, to compare the time to a threshold time, and to issue a warning if the measured time differs from the threshold time by more than a predetermined amount.

A sixth aspect of the present invention provides an aircraft, comprising one or more of: a landing gear controller according to the first aspect of the present invention; a landing gear controller according to the fifth aspect of the present invention; an aircraft landing gear system according to the second aspect of the present invention; and the non-transitory computer-readable storage medium according to the fourth aspect of the present invention.

BRIEF DESCRIPTION OF THE DRAWINGS

Embodiments of the invention will now be described, by way of example only, with reference to the accompanying drawings, in which.

DETAILED DESCRIPTION

An aircraft landing gear is typically held in a retracted position by a landing gear uplock hook when the landing gear is in the retracted position during flight. The landing gear uplock hook is movable between a locked position, in which the landing gear uplock hook is engaged with the landing gear to hold the landing gear in the retracted position, and an unlocked position, in which the landing gear uplock hook is disengaged with the landing gear to allow the landing gear to extend or retract between the retracted position and an extended position.

In the event that the landing gear uplock hook fails, the landing gear uplock hook is still in a locked position, meaning no outward indication that the landing gear uplock hook has failed is apparent and/or that no failure signal is issued by a landing gear extension and retraction system control system.

In the event that the landing gear uplock hook fails, the landing gear falls under gravity until it contacts a landing gear bay door because a landing gear actuator, which controls movement of the landing gear between the extended position and the retracted position is de-pressurised during flight. The landing gear bay door is a door of a landing gear bay for accommodating the landing gear in the retracted position. The landing gear bay door is movable between a closed position, in which the landing gear cannot pass into or out of the landing gear bay, and an open position, in which the landing gear can pass into or out of the landing gear bay.

Whilst the landing gear bay door is configured to withstand the weight of the landing gear when the landing gear bay door is in the closed position, a failure in the landing gear bay door whilst the landing gear bay door is withstanding the weight of the landing gear bay door may result in an uncommanded extension of the landing gear. There is therefore a need for a way to identify whether the landing gear uplock hook has failed.

A typical landing gear extension process may be initiated in response to a signal received based on an input from the pilot, and may comprise the generation of a plurality of signals, each signal causing a particular part of the process to commence. The landing gear extension process is carried out by a landing gear extension and retraction system. The landing gear extension and retraction system may comprise a plurality of sensors configured to indicate a position of a landing gear bay door and a landing gear. The landing gear extension process comprises moving the landing gear bay door from a closed position to an open position and, when a signal is received to indicate that the landing gear bay door has reached the open position, extending the landing gear from a retracted position to an extended position. Embodiments of the present invention may comprise such a landing gear extension and retraction system.

Figure 1A:
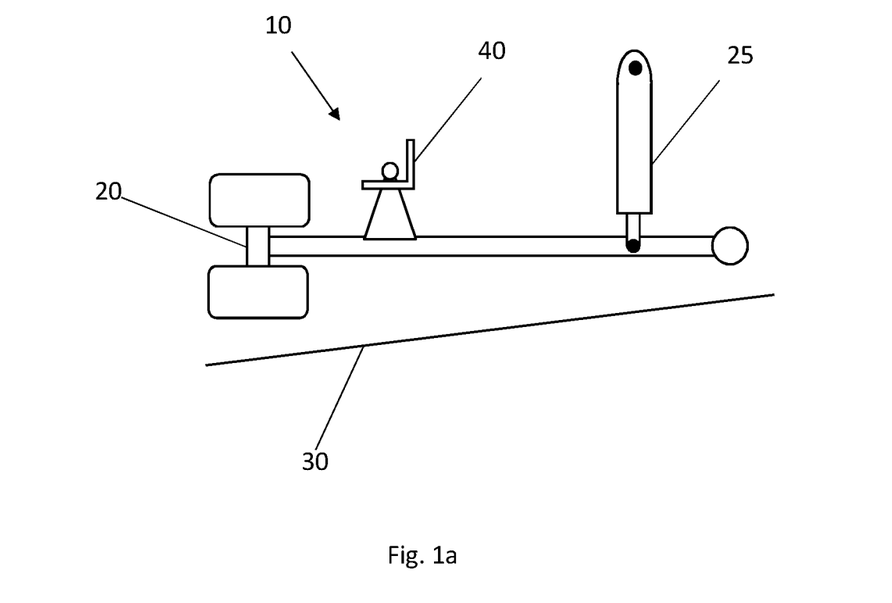
FIGS. 1a and 1b are schematic views of an aircraft landing gear in a retracted position.

FIG. 1a shows a schematic view of a landing gear extension and retraction system 10. The landing gear extension and retraction system 10 comprises a landing gear 20, a landing gear actuator 25, a landing gear bay door 30, and a landing gear uplock hook 40. In FIG. 1a, the landing gear 20 is in a retracted position, in which the landing gear uplock hook 40 is in the locked position to hold the landing gear 20 in a retracted position, the landing gear actuator 25 is de-pressurised and the landing gear bay door 30 is in a closed position. The landing gear uplock hook 40 is configured to hold the landing gear 20 in the retracted position, such that the landing gear 20 is not in contact with the landing gear bay door 30.

Figure 1B:
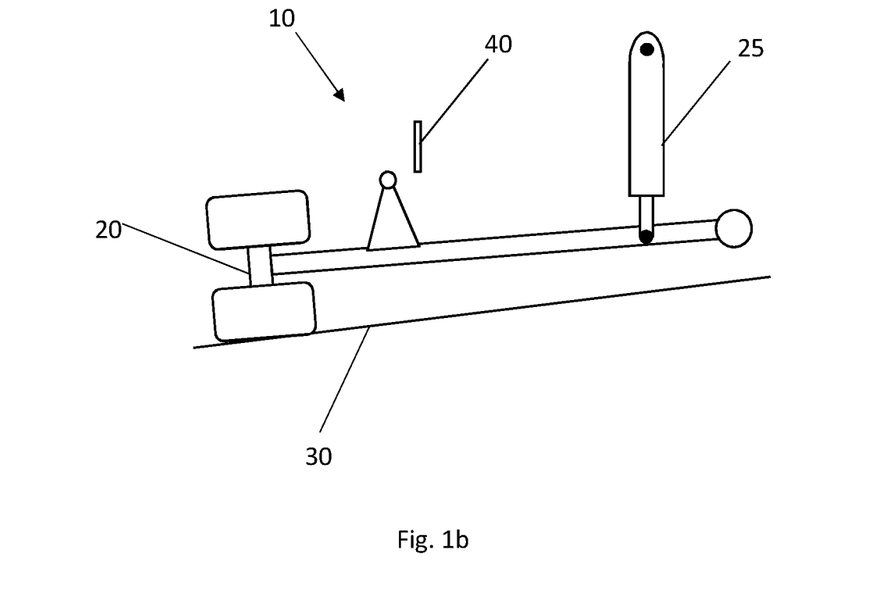

FIG. 1b shows a schematic view of the landing gear extension and retraction system 10 of FIG. 1a. In FIG. 1b, the tip of the landing gear uplock hook 40 has failed and the landing gear uplock hook 40 and the landing gear 20 are disengaged. The landing gear uplock hook 40 remains in the locked position. Since the landing gear actuator 25 is de-pressurised, the landing gear 20 falls under gravity and rests on the landing gear bay door 30.

When an aircraft is coming in to land, a landing gear extension process is initiated, typically by the pilot actuating a lever in the cockpit. A landing gear extension process typically comprises moving the landing gear bay door 30 from the closed position to an open position, energising the landing gear actuator 25 and then moving the landing gear uplock hook 40 from the locked position to the unlocked position. Once the landing gear uplock hook 40 has been moved to the unlocked position, the landing gear actuator 25 is actuated to move the landing gear 20 from the retracted position to the extended position.

In the event that the landing gear uplock hook 40 has failed, the landing gear 20 resting on the landing gear bay door 30 will begin to fall towards the extended position as the landing gear bay door 30 is moved from the closed position to the open position. As such, the landing gear 20 will begin to move from the retracted position to the extended position before the landing gear uplock hook 40 has been moved from the locked position to the unlocked position. The landing gear 30 will therefore reach the extended position sooner than a landing gear that was held in the retracted position by a landing gear uplock hook 40. Embodiments of the present invention are concerned with using this difference in landing gear 30 extension time to indicate that a landing gear uplock hook 40 has failed.

Embodiments of the present invention provide landing gear controller configured to delay extension of a landing gear, to measure a time taken for the landing gear to reach the extended position, to compare the time to a threshold time, and to issue a warning if the measured time differs from the threshold time by more than a predetermined amount.

Figure 2:
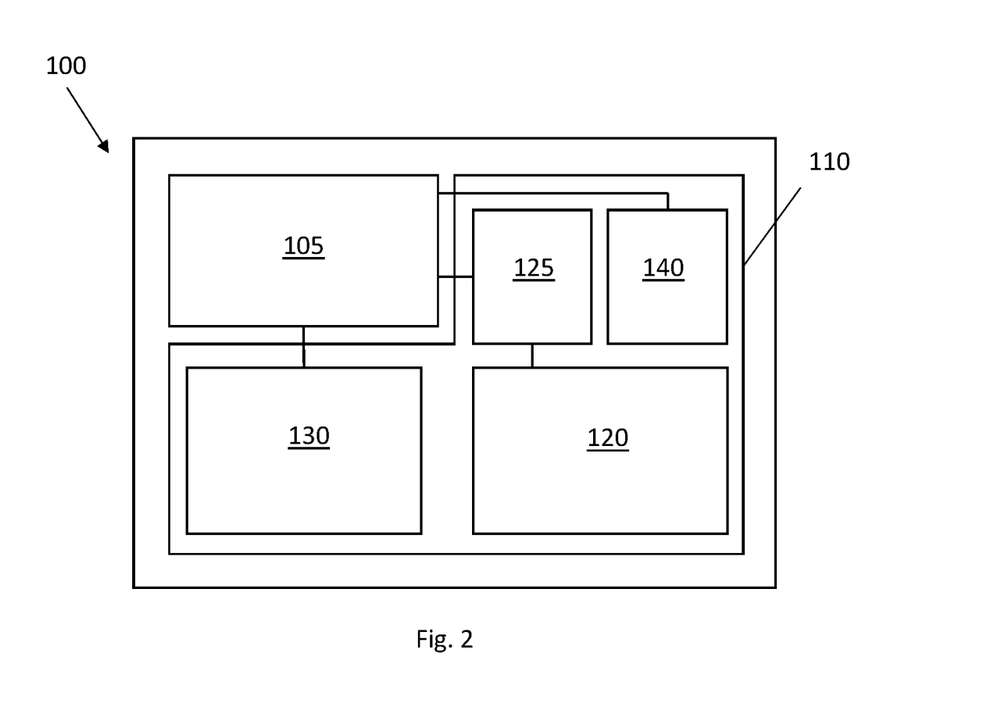
FIG. 2 is a schematic view of an example of a system according to an embodiment of the present invention.

FIG. 2 shows a schematic view of an example aircraft landing gear system 100 according to an embodiment of the present invention. The aircraft landing gear system 100 comprises a landing gear extension and retraction system 110 for an aircraft and a landing gear controller 105 operatively connected to the landing gear extension and retraction system 110.

In this embodiment, the landing gear extension and retraction system 110 comprises a landing gear 120, a landing gear actuator 125, a landing gear bay door 130, and a landing gear uplock hook 140. The landing gear extension and retraction system 110 may be the same as the landing gear extension and retraction system 10 described with reference to FIGS. 1a and 1b. The landing gear controller 105 may be comprised in a landing gear extension and retraction system controller (not shown) for extending and retracting the landing gear 120.

The landing gear extension and retraction system 110 may comprise a plurality of sensors (not shown) configured to indicate the position of the landing gear 120, the landing gear actuator 125, the landing gear uplock hook 140 and the landing gear bay door 130. The plurality of sensors may be configured to provide the signals to the controller 105, for example electrical signals.

The landing gear controller 105 is configured to detect an extension time of the landing gear 120, and if the detected extension time meets a predetermined criterion, provide a warning signal to indicate potential failure of a landing gear uplock hook 140. In some embodiments, the predetermined criterion is dependent upon the operational conditions of the aircraft, or the aircraft landing gear system 100, at the time of extending the landing gear 120. For example, the predetermined criterion may be dependent on one of more of the altitude of the aircraft and the ambient temperature because such parameters may affect the extension time of the landing gear 120.

In some embodiments, the extension time comprises a time between a release signal to move the landing gear bay door 130 to an open position being issued, and the landing gear controller 105 receiving a confirmation signal that the landing gear 120 is in the extended position. The release signal may be issued by the controller 105, or by another controller (not shown) comprised in the aircraft landing gear system 100. The release signal may be issued in response to a signal to commence a landing gear extension process, for example a signal received based on an input from the pilot.

For a landing gear extension and retraction system 110 having a failed landing gear uplock hook 140, the landing gear 120 will reach the extended position sooner than a landing gear extension and retraction system 110 having a fully-functional landing gear uplock hook 140 would be expected to reach the extended position. For a landing gear extension and retraction system 110 having a failed landing gear uplock hook 140, the extension time will therefore be shorter than an expected extension time. In some embodiments, the predetermined criterion is a threshold based upon the expected extension time, and the landing gear controller 105 is configured to provide the warning signal if the detected time is below the threshold. Such embodiments may be used particularly for a nose landing gear.

In some embodiments, the controller 105 is configured to receive a command signal to extend the landing gear 120 from the retracted position to the extended position. The command signal may be issued in response to an indication that the landing gear bay door 130 is in the open position. The command signal may be issued in response to an indication that the landing gear uplock hook 140 is in the unlocked position. In some embodiments, upon receipt of a command signal, the controller 105 is configured to delay extending the landing gear 120 by a predetermined amount of time. Such a delay serves to increase the expected extension time of the landing gear 120, thereby increasing the difference in extension time between a landing gear extension and retraction system 110 having a failed landing gear uplock hook 140 and a landing gear extension and retraction system 110 having a fully-functional landing gear uplock hook 140, as explained below with reference to FIGS. 4a and 4b. Increasing the difference may mean that less sensitive components can be used by the controller 105 to determine if a landing gear uplock hook 140 failure has occurred. Small differences in extension time may be observed due to factors other than a failed landing gear uplock hook 140, and therefore delaying the extension of the landing gear 120 may help to reduce the number of false-positive warning signals being issued by the controller 105 by increasing the difference in extension time between a landing gear extension and retraction system 110 having a failed landing gear uplock hook 140 and a landing gear extension and retraction system 110 having a fully-functional landing gear uplock hook 140.

Figure 3:
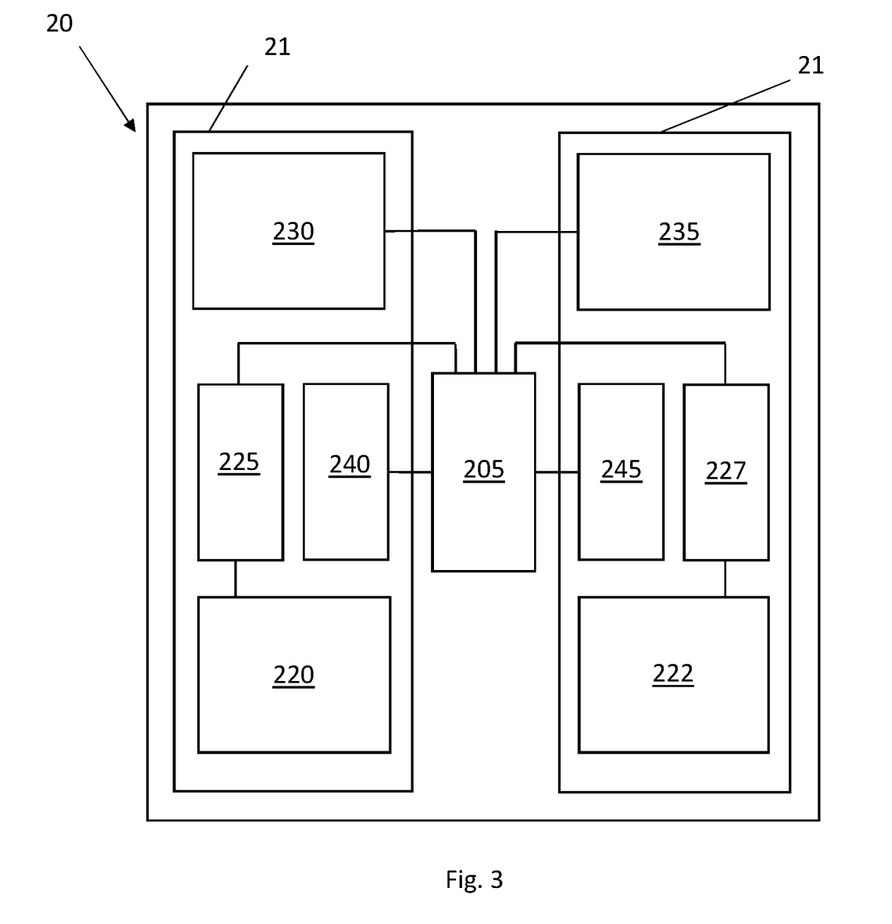
FIG. 3 is a schematic view of an example of a system according to an embodiment of the present invention.

FIG. 3 shows a schematic view of an example aircraft landing gear system 200 according to an embodiment of the present invention. The aircraft landing gear system 200 comprises a left landing gear extension and retraction system 210, a right landing gear extension and retraction system 215 and a landing gear controller 205 operatively connected to the left and right landing gear extension and retraction systems 210, 215. The left and right landing gear extension and retraction systems 210, 215 are substantially the same as the landing gear extension and retraction systems 10, 110 described with reference to FIGS. 1a-2. The left and right landing gear extension and retraction systems 210, 215 comprise respective left and right main landing gears 220, 222, respective left and right landing gear actuators 225, 227, respective left and right landing gear uplock hooks 240, 245 and respective left and right landing gear bay doors, 230, 235.

The landing gear controller 205 is configured to detect the extension time for the left and right main landing gears 220, 222 and to determine a difference between the extension time for each of the respective main landing gears 220, 222. If the determined difference between meets a predetermined criterion, the landing gear controller 205 is configured to provide a warning signal to indicate potential failure of a landing gear uplock hook 140. The predetermined criterion is a threshold difference in the extension time for each of the respective main landing gears 220, 222, and the warning signal is provided by the controller 205 if the determined difference exceeds the threshold.

In some embodiments, the left and right main landing gears 220, 222 are configured to extend simultaneously. For example, the aircraft landing gear system 200 may be configured to move the left and right main landing gears 220, 222 from the retracted position to the extended position simultaneously. In some embodiments, the controller 205 is configured to determine the difference between the extension time for each of the respective main landing gears 220, 222 by measuring the lag time between the landing gear controller 205 receiving respective confirmation signals that the respective landing gear 220, 222 is in an extended position. The controller 205 is configured to compare the lag time to a threshold time, and to provide the warning signal if the lag time is greater than the threshold time.

In some embodiments of the present invention, the aircraft landing gear system 100, 200 is configured to activate the landing gear actuator 125, 225, 227 after the landing gear bay door 130, 230, 235 has reached the open position. Activating the landing gear actuator 125, 225, 227 provides load relief on the landing gear uplock hook 140, 240, 245 so that the landing gear uplock hook 140, 240, 245 can be moved from the locked position to the unlocked position. A landing gear 120, 220, 222 having a failed landing gear uplock hook 140, 240, 245 may have begun falling from the retracted position to the extended position, when the landing gear actuator 125, 225, 227 is activated. Activation of the landing gear actuator 125, 225, 227 may slow the rate of fall of the falling landing gear 120, 220, 222 to a normal extension rate for the landing gear 120, 220, 222 and/or may cause the falling landing gear 120, 220, 222 to be lifted back towards to retracted position before moving to the extended position at the normal extension rate.

Figure 4A:
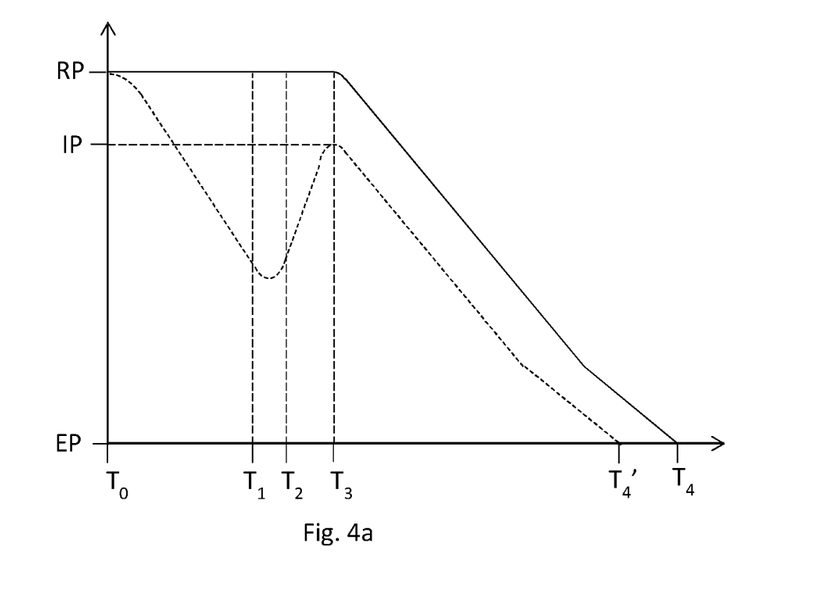
FIGS. 4a and 4b are graphs showing an aircraft landing gear extension implemented in an embodiment of the present invention and an aircraft landing gear extension of a comparative example.
Figure 4B:
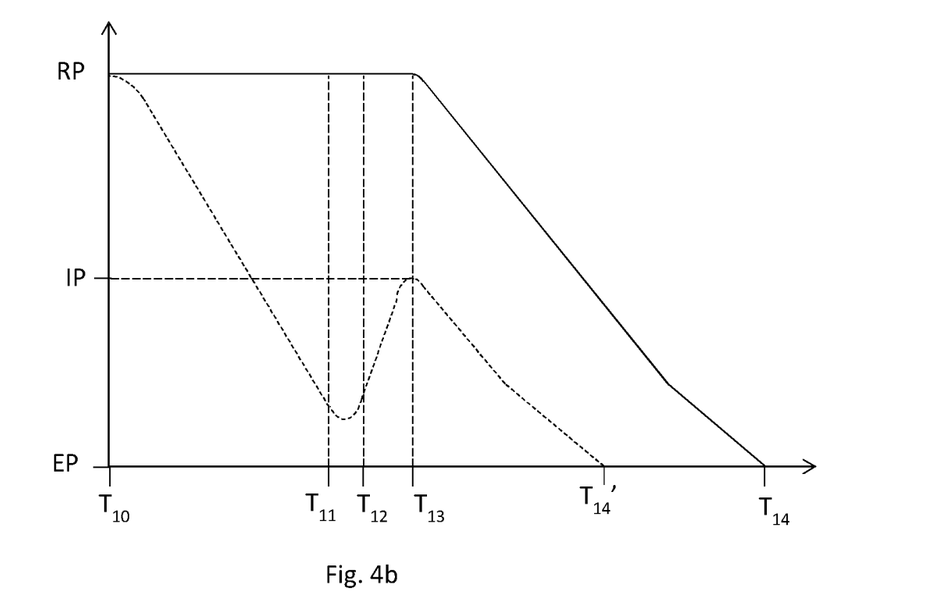

FIGS. 4a and 4b are graphs showing an aircraft landing gear extension for a normal landing gear extension process (solid line) and an aircraft landing gear extension for a landing gear in an aircraft landing gear system having a failed landing gear uplock hook (dashed line). In FIG. 4a, at time $T_0$, movement of a landing gear bay door from a closed position to an open position commences in response to a release signal to move the landing gear bay door from the closed position to the open position. At time $T_1$, a landing gear actuator is pressurised in response to a command signal to retract the landing gear to provide load relief on a landing gear uplock hook. At time $T_2$, movement of a landing gear uplock hook from a locked position to an unlocked position commences. At time $T_3$, when the landing gear uplock hook has reached the unlocked position, the landing gear actuator is pressurised in response to a command signal to extend the landing gear and movement of the landing gear from the retracted position RP to an extended position EP commences. At time $T_4$, the landing gear reaches the extended position EP.

The solid line shown in FIG. 4a shows the movement of a landing gear in a landing gear extension process with a correctly functioning landing gear uplock hook. The landing gear is held in the retracted position RP until time $T_3$, and is moved from the retracted position RP to the extended position EP at a normal extension rate between time $T_3$ and time $T_4$.

The dashed line in FIG. 4a shows the movement of a landing gear in an aircraft landing gear system having a failed landing gear uplock hook. The landing gear is not held by the landing gear uplock hook and therefore begins to fall from the retracted position RP to the extended position EP at time $T_0$. At time $T_1$, the fall of the landing gear is halted and reversed so that the landing gear is moved back towards the retracted position RP to an intermediate position IP, in response to the pressurisation of the landing gear actuator. The landing gear is then moved from the intermediate position IP to the extended position EP at a normal extension rate after time $T_3$. The landing gear reaches the extended position EP at time $T_4'$, which is before time $T_4$. In other embodiments, the fall of the landing gear may not be reversed and the falling landing gear slows to the normal extension rate after time $T_3$.

In embodiments of the present invention, the predetermined criterion is a threshold time based upon time $T_4$, and time $T_4'$ is compared to the threshold time by the controller 105. The controller 105 is configured to provide the warning signal if $T_4'$ is below the threshold time. For example, the threshold time may be a predetermined percentage of time $T_4$, to account for normal fluctuations in extension time.

In other embodiments, the solid line of FIG. 4a represents the normal extension of a main landing gear and the dashed link of FIG. 4a represents the extension of a main landing gear in an aircraft landing gear system having a failed landing gear uplock hook. As such, time $T_4$ may be variable between different landing gear extensions due to external factors such as the aircraft being in side slip. In side slip, the force exerted by the airflow over the aircraft may be different on different sides of the aircraft, causing the main landing gears to extend at different rates. The controller 205 is configured to determine a difference between $T_4$ and $T_4'$ and to provide the warning signal if the difference is greater than a threshold difference.

As can be seen from FIG. 4a, the difference in time between $T_4$ and $T_4'$ may be relatively small compared to the overall extension time. The difference in time can be increased by delaying time $T_3$ at which the landing gear actuator is activated and movement of the landing gear from the retracted position RP to an extended position EP commences. FIG. 4b shows how such a delay can increase the difference in extension time between a landing gear in a normal landing gear extension process and a landing gear in an aircraft landing gear system having a failed landing gear uplock hook.

In FIG. 4b, at time $T_{10}$, movement of a landing gear bay door from a closed position to an open position commences in response to a release signal to move the landing gear bay door from the closed position to the open position. At time $T_{11}$, a landing gear actuator is pressurised in response to a command signal to retract the landing gear to provide load relief on a landing gear uplock hook. At time $T_{12}$, movement of a landing gear uplock hook from a locked position to an unlocked position commences. At time $T_{13}$, when the landing gear uplock hook has reached the unlocked position, the landing gear actuator is pressurised in response to a command signal to extend the landing gear and movement of the landing gear from the retracted position RP to an extended position EP commences. At time $T_{14}$, the landing gear reaches the extended position EP. In FIG. 4b, times $T_{11}$, $T_{12}$, $T_{13}$ and $T_{14}$ are, respectively, x seconds greater than times $T_1$, $T_2$, $T_3$ and $T_4$ of FIG. 4a. That is, pressurisation of the landing gear actuator is delayed by x seconds so that the landing gear reaches the extended position EP x seconds later than in the extension process shown in FIG. 4a. In some embodiments, x seconds is less than 1 second. In some embodiments x seconds is one second or more.

The solid line shown in FIG. 4b shows the movement of a landing gear in a normal landing gear extension process. The landing gear is held in the retracted position RP until time $T_{13}$, and is moved from the retracted position RP to the extended position EP at a normal extension rate between time $T_{13}$ and time $T_{14}$.

The dashed line in FIG. 4b shows the movement of a landing gear in an aircraft landing gear system having a failed landing gear uplock hook. The landing gear is not held by the landing gear uplock hook and therefore begins to fall from the retracted position RP to the extended position EP at time $T_{10}$. At time $T_{11}$, the fall of the landing gear is halted and reversed so that the landing gear is moved back towards the retracted position RP to an intermediate position IP, in response to the pressurisation of the landing gear actuator. The landing gear is then moved from the intermediate position IP to the extended position EP at a normal extension rate after time $T_{13}$. The landing gear reaches the extended position EP at time $T_{14}'$, which is before time $T_{14}$. In other embodiments, the fall of the landing gear may not be reversed and the falling landing gear slows to the normal extension rate after time $T_{13}$. By delaying pressurisation of the landing gear actuator to time $T_{13}$, the landing gear has fallen further towards the extended position EP when the landing gear actuator is pressurised, compared to FIG. 4a. As shown in FIG. 4b, this results in a greater difference in time between $T_{14}$ and $T_{14}'$ than between $T_4$ and $T_4'$.

In embodiments of the present invention, the predetermined criterion is a threshold time based upon time $T_{14}$, and time $T_{14}'$ is compared to the threshold time by the controller 105. The controller 105 is configured to provide the warning signal if $T_{14}'$ is below the threshold time. For example, the threshold time may be a predetermined percentage of time $T_4$, to account for normal fluctuations in extension time.

In other embodiments, the solid line of FIG. 4b represents the normal extension of a main landing gear and the dashed link of FIG. 4b represents the extension of a landing gear in an aircraft landing gear system having a failed landing gear uplock hook. As such, time $T_{14}$ may be variable between different landing gear extensions due to external factors. The controller 205 is configured to determine a difference between $T_{14}$ and $T_{14}'$ and to provide the warning signal if the difference is greater than a threshold difference.

Figure 5:
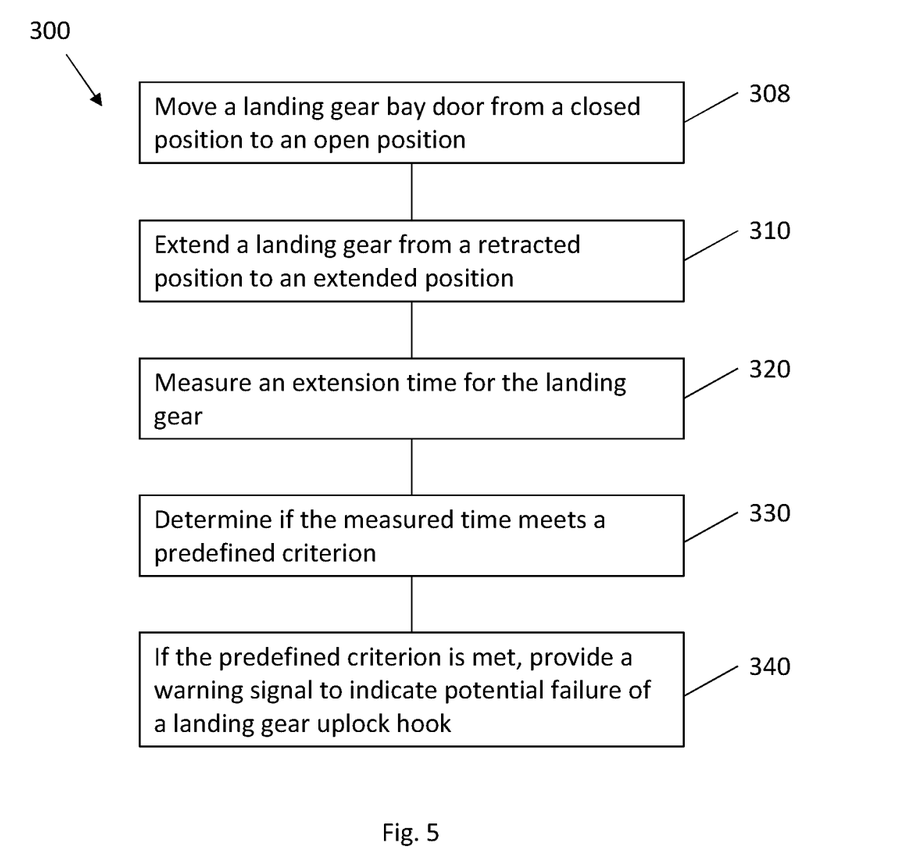
FIG. 5 is a flow diagram showing an example of a method according an embodiment of the present invention.

The present invention provides a method to detect failure of a landing gear uplock hook. FIG. 5 is a flow diagram showing an example of a method 300 according to an embodiment of the present invention. The method comprises: extending 310 a landing gear from a retracted position to an extended position, measuring 320 an extension time for the landing gear, determining 330 if the measured time meets a predefined criterion, and if the predefined criterion is met, providing 340 a warning signal to indicate potential failure of a landing gear uplock hook. The method may be carried out by an aircraft landing gear system 100, 200 according to embodiments of the present invention. In some embodiments, the extension time is a time between a release signal to move a landing gear bay door to an open position being issued, and a landing gear controller receiving a confirmation signal that the landing gear is in the extended position.

Figure 6:
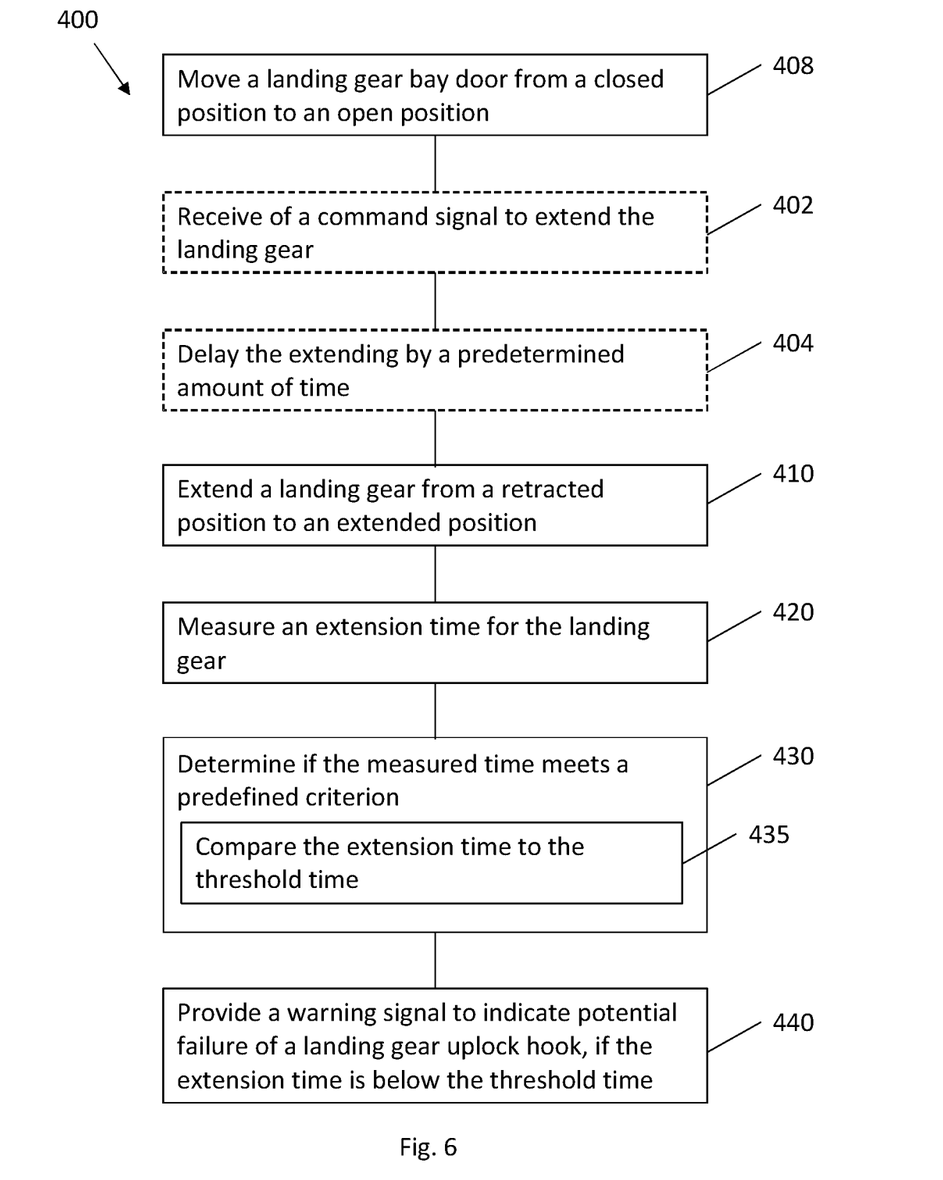
FIG. 6 is a flow diagram showing an example of a method according an embodiment of the present invention.

In the method 400 shown in FIG. 6, common steps to the method 300 shown in FIG. 5 have the same reference numerals, but increased by 100. Embodiments of the present invention provide a method 400 to detect failure of a landing gear uplock hook, as shown in FIG. 6. In the method 400, the predetermined criterion is a threshold time based upon an expected extension time. In the method 400, the determining 430 comprises comparing 435 an extension time to the threshold time. The method 400 comprises providing 440 the warning signal if the extension time is below the threshold time. In some embodiments, the method 400 comprises, upon receipt 402 of a command to extend the landing gear, delaying 404 the extending 410 by a predetermined amount of time. The delaying 404 can increase the difference in extension time between a normal extension process and an extension of a landing gear in an aircraft landing gear system having a failed landing gear uplock hook.

Figure 7:
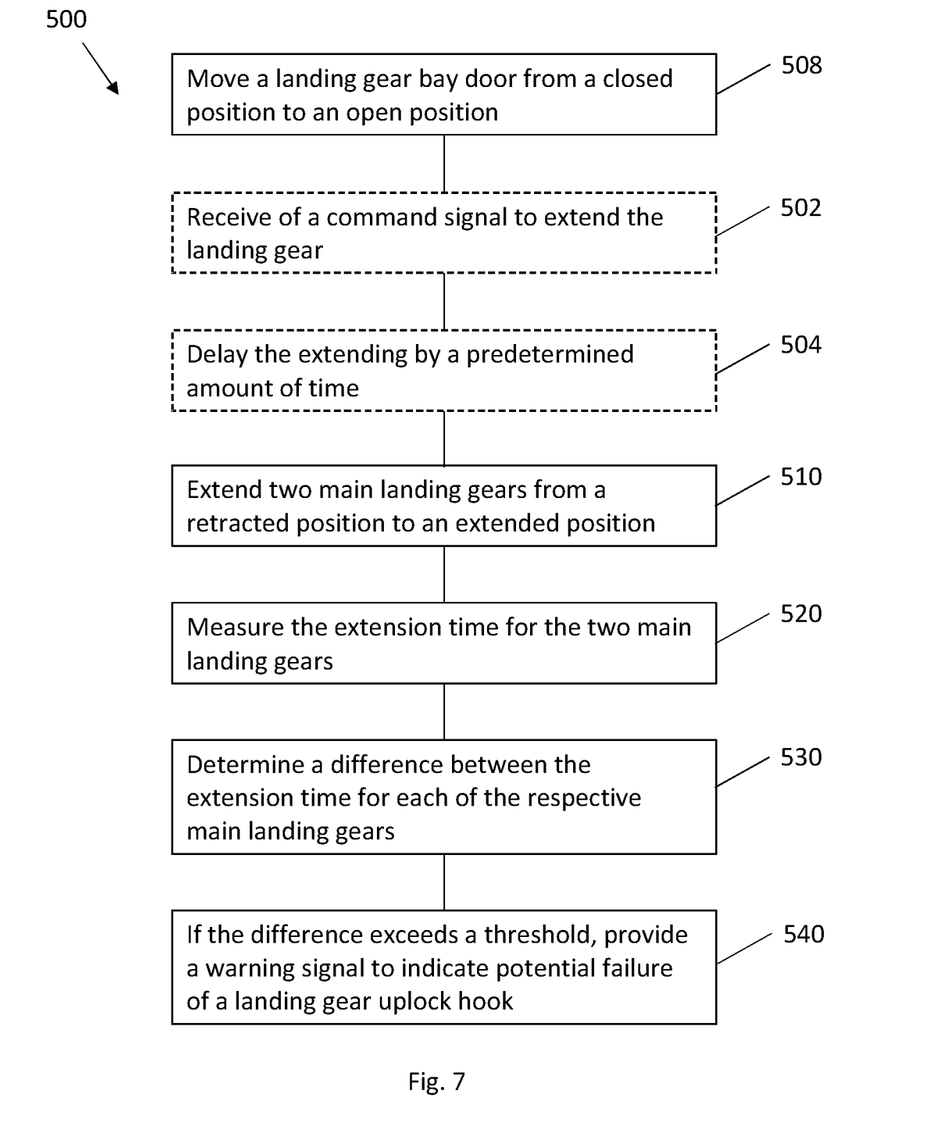
FIG. 7 is a flow diagram showing an example of a method according an embodiment of the present invention.

In the method 500 shown in FIG. 7, common steps to the method 300 shown in FIG. 5 have the same reference numerals, but increased by 200. Embodiments of the present invention provide a method 500 to detect failure of a landing gear uplock hook, as shown in FIG. 7. In the method 500, the measuring 520 comprises measuring the extension time for two main landing gears on an aircraft, and the determining 530 comprises determining a difference between the extension time for each of the respective main landing gears. The method 500 comprises providing 540 the warning signal if the difference exceeds a threshold. In some embodiments, the method 500 comprises: upon receipt 502 of a command to extend the landing gear, delaying 504 the extending 510 by a predetermined amount of time.

Figure 8:
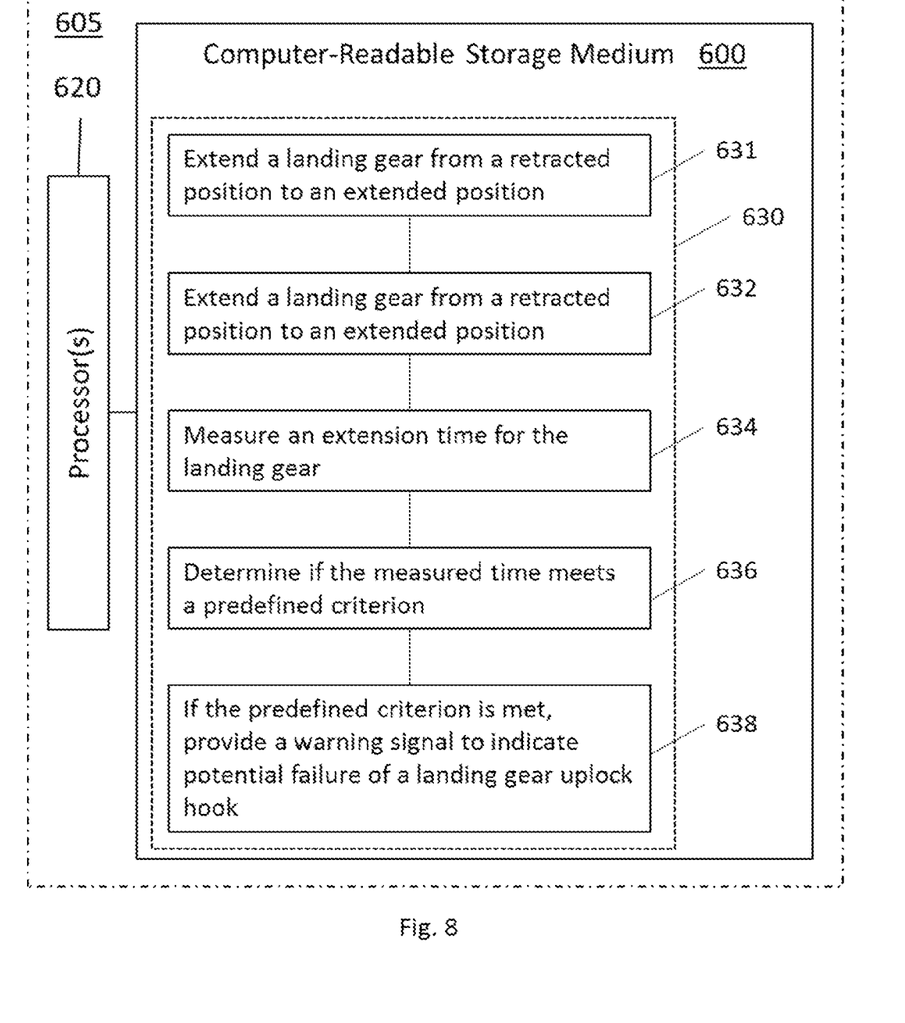
FIG. 8 is a schematic diagram of an example of a non-transitory computer-readable storage medium according an embodiment of the present invention.

FIG. 8 shows a schematic diagram of a non-transitory computer-readable storage medium 600 according to an embodiment of the present invention. The non-transitory computer-readable storage medium 600 stores instructions 630 that, if executed by a processor 620 of a controller 605, cause the processor 620 to perform a method according to an embodiment of the present invention. In some embodiments, the controller 605 is the landing gear controller 105, 205 as described above with reference to FIGS. 2 and 3. The instructions 630 comprise: extending 632 a landing gear from a retracted position to an extended position, measuring 634 an extension time for the landing gear, determining 636 if the measured time meets a predefined criterion, and if the predefined criterion is met, providing 638 a warning signal to indicate potential failure of a landing gear uplock hook. The instructions 630 may comprise instructions to perform the operations of one of the methods 300, 400, 500 described above with reference to FIGS. 5-7, respectively.

Figure 9:
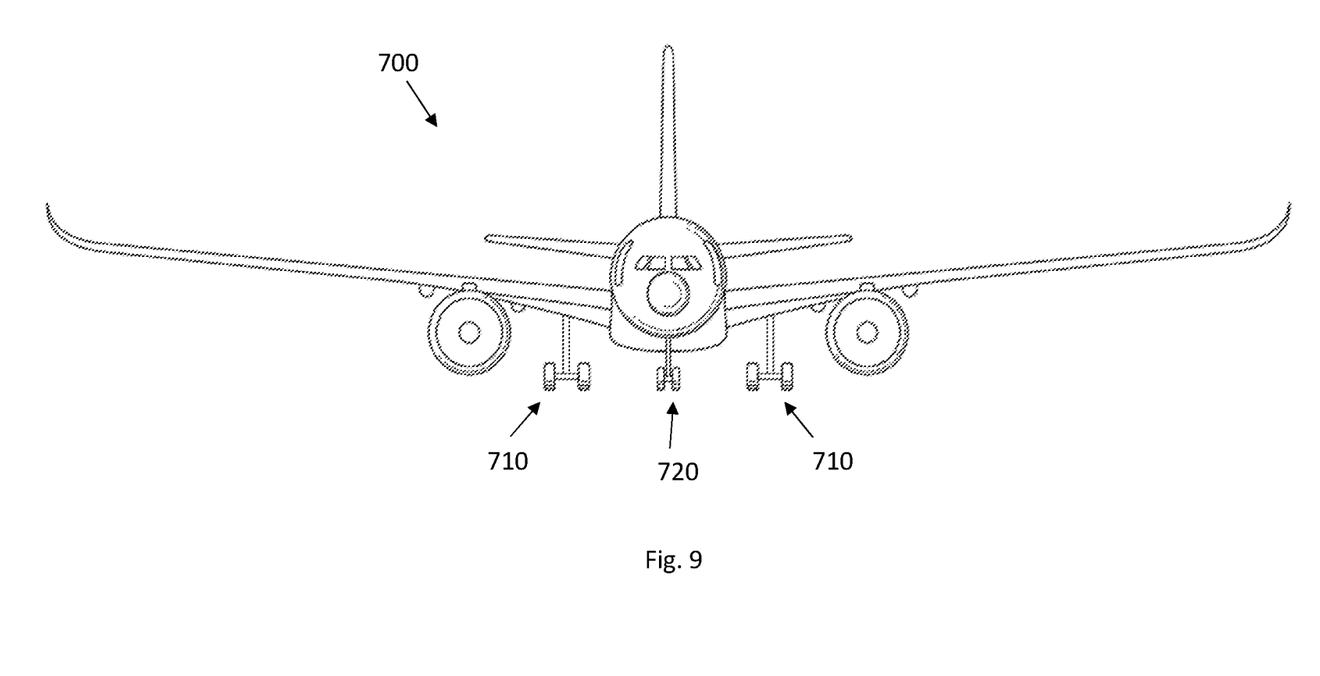
FIG. 9 is a schematic front view of an example of an aircraft according to an embodiment of the present invention.

FIG. 9 shows a schematic diagram of an aircraft 700 in accordance with an embodiment of the present invention. In this embodiment, the aircraft 700 comprises two main landing gears 710 and a nose landing gear 720. In some embodiments, the aircraft 700 also comprises the non-transitory computer-readable storage medium 600 (not shown) discussed above with reference to FIG. 6. In some embodiments, the aircraft 700 also comprises the aircraft landing gear system 100, 200 (not shown) discussed above with reference to FIGS. 2 and 3. In some embodiments, the aircraft 700 comprises a controller 105, 205 according to embodiments of the present invention.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. A landing gear controller for an aircraft including two main landing gears, the landing gear controller configured to:
   detect an extension time for each of the two main landing gears of the aircraft;
   determine a difference between the detected extension times for the two main landing gears;
   compare the difference between the detected extension times to a predetermined threshold difference in the extension times of the two main landing gears; and if the difference between the detected extension times exceeds the predetermined threshold difference, provide a warning signal to indicate potential failure of a landing gear uplock hook for at least one of the two main landing gears to hold the at least one of the two main landing gears in a retraction position.

2. The landing gear controller according to claim 1, wherein the landing gear controller is configured to:
   move a landing gear bay door from a closed position to an open position and, when the landing gear bay door has reached the open position, extend the two main landing gears from a retracted position to an extended position.

3. The landing gear controller according to claim 1, wherein the landing gear controller is configured to, upon receipt of a command signal to extend the two main landing gears, delay extending at least one of the two main landing gears by a predetermined amount of time to increase an expected extension time of the at least one of the two main landing gears.

4. The landing gear controller according to claim 1, wherein the two main landing gears are configured to extend simultaneously.

5. The landing gear controller according to claim 1, wherein the difference between the extension time for each of the two main landing gears is determined by measuring a time difference between the landing gear controller receiving respective confirmation signals that each of the two main landing gears is in an extended position.

6. An aircraft landing gear system comprising:
   a landing gear extension and retraction system; and
   the landing gear controller of claim 1 is operatively connected to the landing gear extension and retraction system.

7. A method to detect failure of a landing gear uplock hook, the method comprising:
   moving a landing gear bay door from a closed position to an open position;
   extending a landing gear from a retracted position to an extended position,
   measuring an extension time for the landing gear,
   determining if the measured time meets a predefined criterion, and
   if the predefined criterion is met, providing a warning signal to indicate potential failure of a landing gear uplock hook,
   wherein the extending comprises extending two main landing gears from a retracted position to an extended position, and the method comprises:
   measuring the extension time for the two main landing gears on an aircraft,
   determining a difference between the extension time for each of the respective main landing gears, and
   if the difference exceeds a threshold, providing the warning signal.

\* \* \* \* \*